May 8, 1945.　　　　W. I. LUTON　　　　2,375,567
SAFETY INSTRUMENT BOARD CUSHION
Filed Aug. 4, 1942　　　2 Sheets-Sheet 1
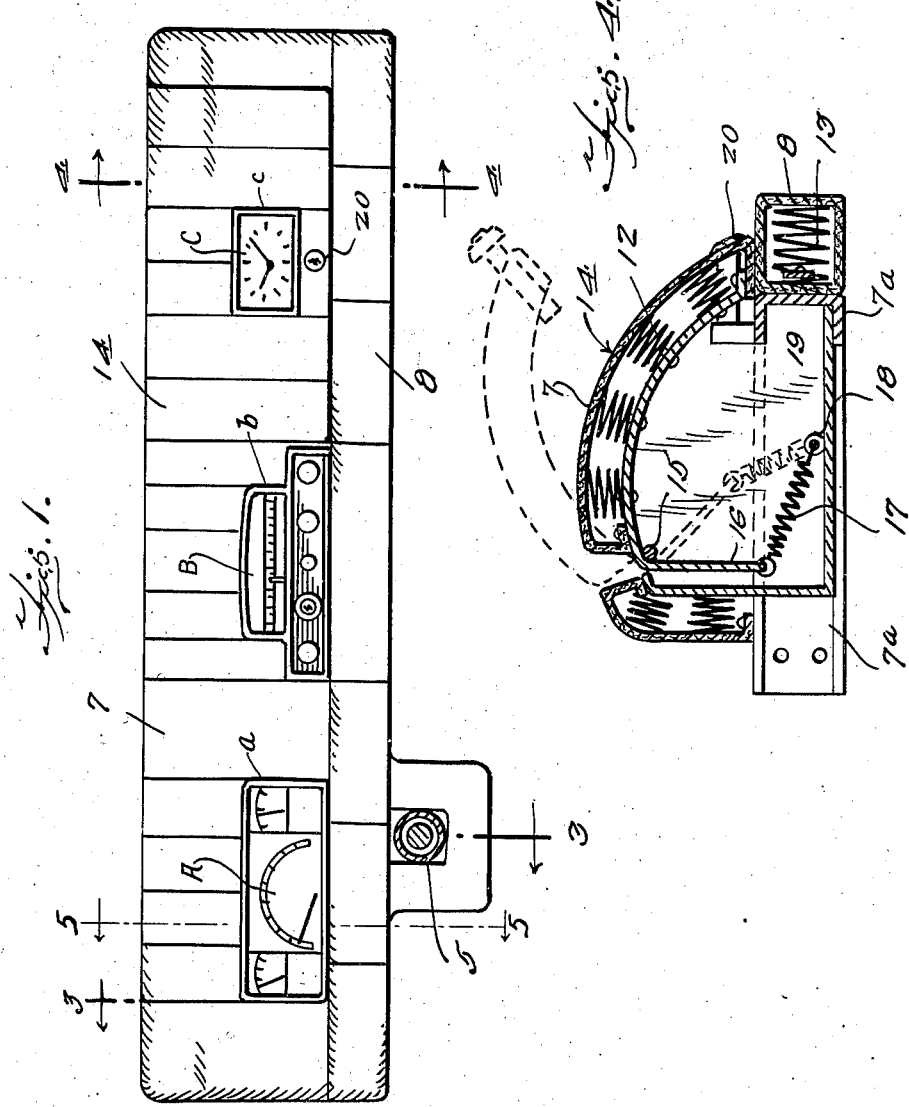
Inventor
William I. Luton
By Clarence A. O'Brien
and Harvey B. Jackson, Attorneys

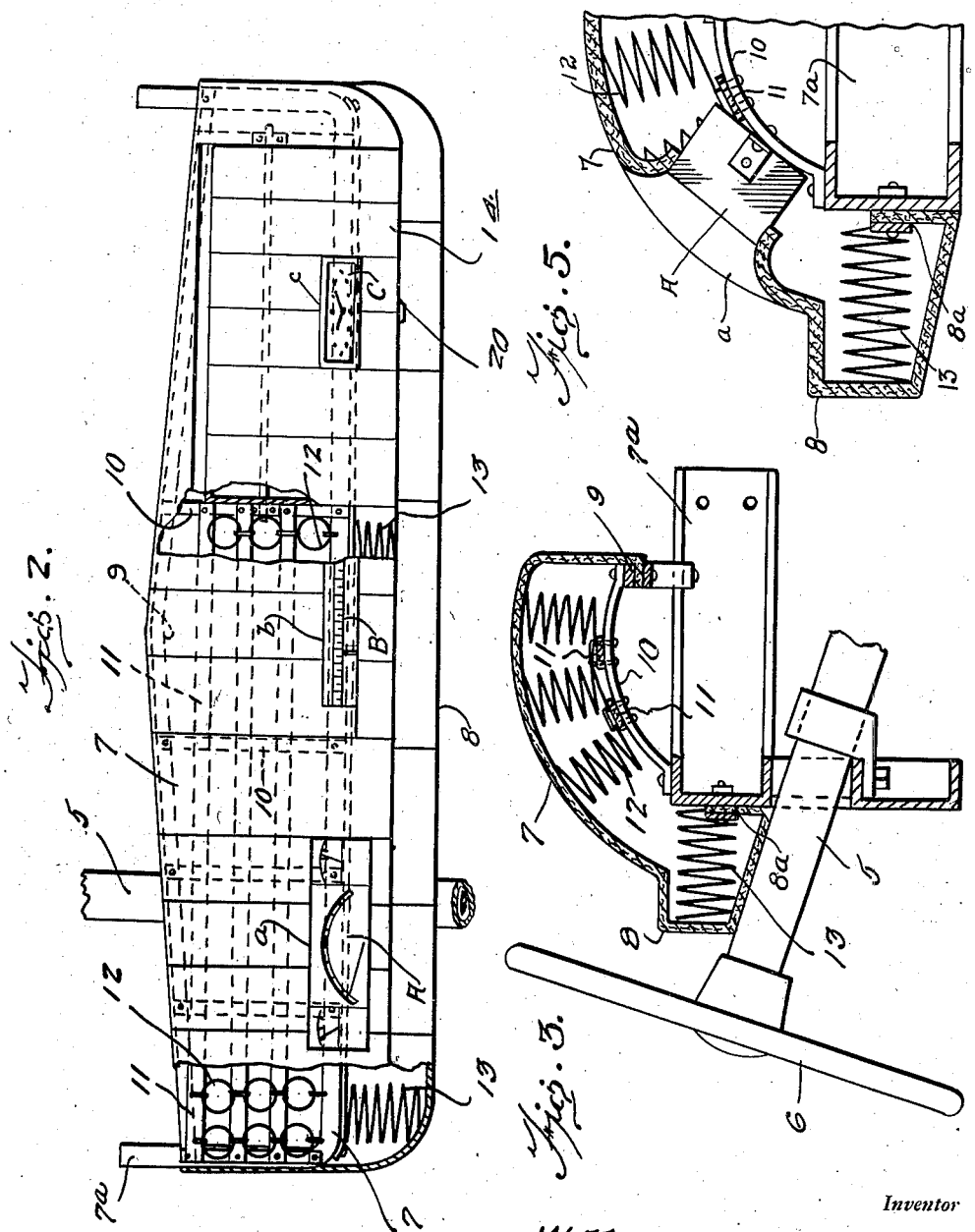

Patented May 8, 1945

2,375,567

UNITED STATES PATENT OFFICE 2,375,567

SAFETY INSTRUMENT BOARD CUSHION

William I. Luton, Nashville, Tenn., assignor of one-half to William O. Luton, Sylvia, Tenn.

Application August 4, 1942, Serial No. 453,590

2 Claims. (Cl. 180—90)

This invention relates to new and useful improvements in instrument boards for automobiles and other vehicles.

The principal object of the present invention is to provide a cushioned instrument board which will serve to absorb the shock of a person striking against the same as when the vehicle is stopped suddenly or is in a collision.

Another important object of the invention is to provide a cushioned instrument board in which the various conventional control members are set back beyond the outer surface of the cushion structure so as to protect any one striking the cushion from contacting the said control members.

Another important object of the invention is to provide a cushion for instrument boards which will extend upwardly and downwardly and over the instrument board to such extents as to offer a cushioned barrier for occupants of a vehicle so as to protect their chests, knees and other parts of their body against sudden impact in the event of a collision, this without interfering with the operation of the vehicle either from the standpoint of vision or manipulation of control members.

Other objects and advantages of the invention will become apparent to the reader of the following description.

In the drawings—

Figure 1 is a front elevational view showing the steering column in section.

Figure 2 is a top plan view with parts broken away.

Figure 3 is a cross sectional view taken substantially on the line 3—3 of Figure 1.

Figure 4 is a sectional view on the line 4—4 of Figure 1.

Figure 5 is a sectional view taken on line 5—5 of Figure 1.

Referring to the drawings wherein like numerals designate like parts, it can be seen that numeral 5 denotes a steering column and numeral 6 a steering wheel such as are found on modern automobiles.

In carrying out the present invention, a horizontally disposed U-shaped frame 7a supports the instrument board, which is in the form of a shell 7 constructed of leather or any other suitable and flexible material, the lower rear portion of which bulges toward the driver's seat as at 8 and then extends forwardly for attachment to the frame 7a as at 8a.

An elongated bridge member 9 spans the leg portions of the frame 7a at the front edge of the instrument board, and this bridge member serves to support the front ends of a plurality of transverse arcuate spring strips 10, whose rear ends are attached to the intermediate portion of the frame 7a and which, in turn, support a plurality of longitudinal elongated strips 11 to which are secured the lower ends of compression springs 12, these springs bearing against the underside of the shell or covering 7 as in the manner suggested in Figure 3. Further, compression springs 13 are interposed between the connecting or intermediate portion of the U-shaped frame 7a and the inner side of the bulged portion 8 of the covering 7. The instrument board has an opening at one end, and mounted in the frame 7a in registry with such opening is a glove compartment 19.

A closure 14 for the glove compartment 19, which is upholstered in the manner described in connection with the rest of the instrument board, is fulcrumed at its front or upper edge by a pin or shaft 15, and has a tail portion 16 connected by a tension spring 17 to an anchor 18 on the bottom of the compartment 19. The various instruments A, B and C are set in openings provided in the instrument board and glove closure at a, b and c.

Numeral 20 denotes a lock for the closure 14 which, of course, can also be used as a handle.

Obviously, the compartment 19 can be used for any article that a glove compartment is ordinarily used for.

It can also be seen that in the event of a quick stopping of the vehicle or in the event of a collision, a person thrown against the instrument board thus cushioned, will be less apt to be injured than if he was struck against the metal instrument board now in general use.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An instrument board for motor vehicles, comprising a U-shaped horizontal frame having an intermediate portion and forwardly extending legs, an elevated longitudinal member bridging the legs of the frame at the front edge of the instrument board, arcuate upward arched transverse spring strips bridging the intermediate portion of the frame and said longitudinal member, further longitudinal members supported by said spring strips, a leather covering secured over said frame, members and strips and having a rearwardly bulged lower rear portion, compression springs interposed between said spring strips and said covering to yieldingly sustain the latter in forwardly and upwardly arched form, and further horizontal compression springs interposed between the intermediate portion of said frame and the rearwardly bulged lower rear portion of the covering.

2. An instrument board for motor vehicles, comprising a U-shaped horizontal frame having an intermediate portion and forwardly extending legs, an elevated longitudinal member bridging the legs of the frame at the front edge of the instrument board, arcuate upwardly arched transverse spring strips bridging the intermediate portion of the frame and said longitudinal member, further longitudinal members supported by said spring strips, a leather covering secured over said frame, members and strips and having a rearwardly bulged lower rear portion, compression springs interposed between said spring strips and said covering to yieldingly sustain the latter in forwardly and upwardly arched form, and further horizontal compression springs interposed between the intermediate portion of said frame and the rearwardly bulged lower rear portion of the covering, said covering having an opening therein at one end of the instrument board, a glove compartment mounted in the frame in registery with said opening, a hinged cushion cover for said opening, further spaced openings in the covering to one side of the glove compartment, and instruments set in said further openings and mounted in the frame.

WILLIAM I. LUTON.